July 22, 1924.                                                1,502,080
D. C. WILSON
AXLE PULLEY FOR CAR LIGHTING
Filed April 18, 1923

INVENTOR
Don C. Wilson,
BY
Snight Bros
ATTORNEYS

Patented July 22, 1924.

1,502,080

UNITED STATES PATENT OFFICE.

DON C. WILSON, OF EAST ORANGE, NEW JERSEY.

AXLE PULLEY FOR CAR LIGHTING.

Application filed April 18, 1923. Serial No. 632,881.

*To all whom it may concern:*

Be it known that I, DON C. WILSON, a citizen of the United States, and a resident of East Orange, county of Essex, and State of New Jersey, have invented certain new and useful Improvements in Axle Pulleys for Car Lighting, of which the following is a specification.

The object of my invention is to provide improved means for transmitting power from the axle of a railroad truck to a dynamo or like machine mounted on the body of the car.

The invention consists in an improved construction of the driving pulley that is mounted on the truck axle whereby the belt transmitting power therefrom may run with greater steadiness and give a more efficient transmission.

More specifically my invention consists in forming the periphery of the driving pulley with flaring ends to preserve parallelism with the belt when the truck swivels on curves and with a central crowned part for driving the belt under the normal conditions of substantial alignment of the truck with the car body when the car is running on tangents or on tracks with very slight curvature.

As is well known a belt will last much longer and will run much truer on a crowned pulley than on a flat pulley and when instead of being crowned the pulley is concave a tendency that a belt always has to climb to the highest diameter of the pulley is continuously causing the belt to tend to run to one side or the other of a position of true alignment.

In the accompanying drawings:—

Figure 1:
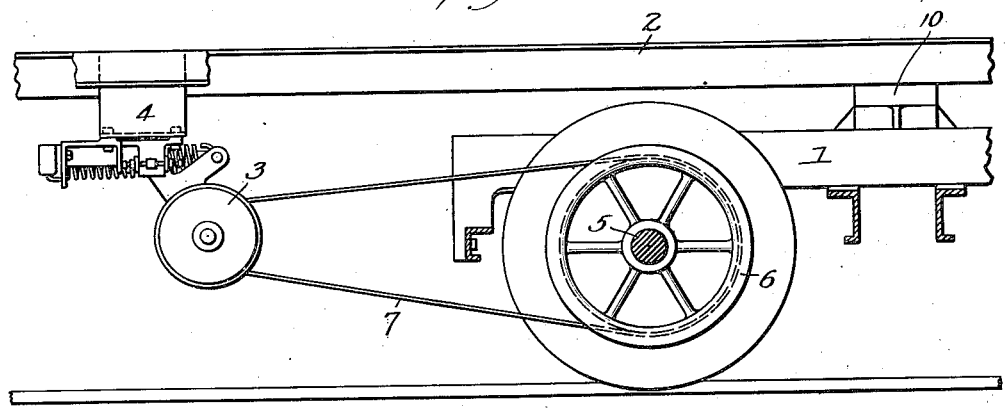
Figure 1 is a longitudinal vertical section thru one end of a car floor and one end of a swivel truck showing the general arrangement of a transmitting mechanism utilizing my invention.

1 is the frame of the swivel truck supporting a car body 2. Dynamo 3 is hung pivotally on the hangers 4 fastened to the under side of the car body. On the axle 5 is secured a driving pulley 6 which thru belt 7 transmits power to the drive pulley 8 of the dynamo.

Figure 2:
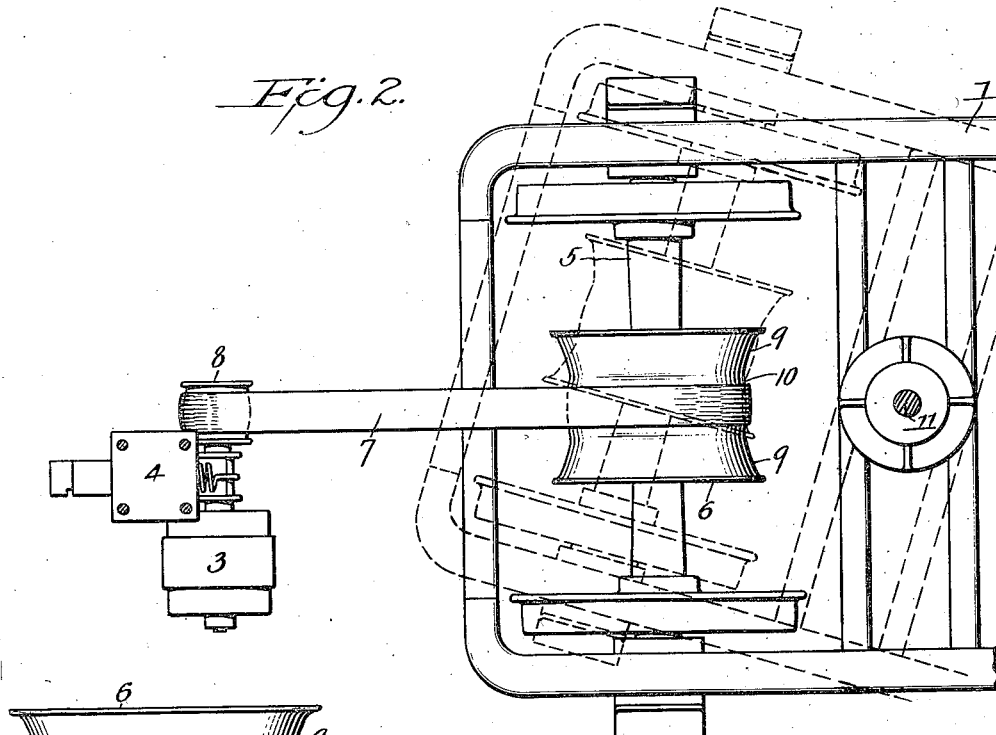
Figure 2 is a plan view of the same with the car body removed.
Figure 3:
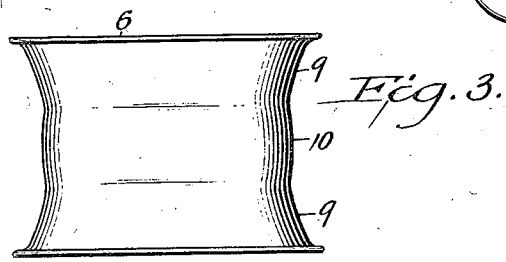
Figure 3 is a detail plan view of my improved driving pulley.

The driving pulley 6 is made as shown in Figure 3 with outwardly flaring ends 9 and a central crowned portion 10. The flaring extensions 9 are developed in such a way as to have their surfaces on the side of the pulley toward the king-pin 11 of the truck, everywhere concentric with said king-pin, so that in the swivelling of the truck, not only will the distance between the driving face of the driving pulley and the driven face of the driven pulley remain constant, but they will also at all times be parallel at their parts which are in contact with the belt. Such a formation of the driving pulley will obviously be less liable to cause wear and tear of the belt as a very slight crowning at the center of the pulley will keep the belt running true and prevent it from climbing either of the concave flaring side portions. When, however, the truck in going around a curve assumes a position such as shown in dotted lines in Figure 2, the belt will run off the slightly crowned center onto a concave flare which while not presenting ideal contact conditions for the belt will nevertheless, keep the driving surfaces substantially parallel with the attendant advantages as above outlined.

While I have shown my improved pulley as applied to the driving of a dynamo of a car from an axle on a swivel truck, it is obvious that such a pulley may be used in any belt drive where one pulley is swivelling with relation to the other.

I claim:—

1. In a belt drive, the combination of a pulley turning on a fixed axis, a pulley turning on a swivelling axis and a belt connecting the two pulleys, the swivelling pulley being characterized by a central crowned portion on which the belt normally runs and flaring side portions, upon which the belt runs when the pulleys are out of parallelism for maintaining constant belt length.

2. The combination of a car body a swivel truck supporting the same, a pulley mounted in bearing on the car body, and a pulley mounted on the car axle characterized by a central crowned portion for driving on straight track and flaring side extensions for driving on curved track.

DON C. WILSON.